United States Patent
DeVos

(12) United States Patent (10) Patent No.: US 7,437,388 B1
DeVos (45) Date of Patent: Oct. 14, 2008

(54) PROTECTING DATA FOR DISTRIBUTED APPLICATIONS USING COOPERATIVE BACKUP AGENTS

(75) Inventor: Steven Robert DeVos, Kirkland, WA (US)

(73) Assignee: Symantec Corporation, Cupertino, CA (US)

( * ) Notice: Subject to any disclaimer, the term of this patent is extended or adjusted under 35 U.S.C. 154(b) by 418 days.

(21) Appl. No.: 11/018,636

(22) Filed: Dec. 21, 2004

(51) Int. Cl.
 *G06F 12/00* (2006.01)
(52) U.S. Cl. ...................................... 707/204
(58) Field of Classification Search .................. 707/204
 See application file for complete search history.

(56) References Cited

U.S. PATENT DOCUMENTS 6,505,216 B1 * 1/2003 Schutzman et al. ......... 707/204
2004/0019892 A1 * 1/2004 E. et al. ...................... 718/107
2004/0117572 A1 * 6/2004 Welsh et al. ................ 711/162

* cited by examiner

*Primary Examiner*—Wilson Lee
*Assistant Examiner*—Michael Le
(74) *Attorney, Agent, or Firm*—Meyertons Hood Kivlin Kowert & Goetzel, P.C.; Rory D. Rankin

(57) ABSTRACT

A method and mechanism for performing backup and restore operations in a computing system. A computing system includes a first agent on a first host, a second agent on a second host, a plurality of data sources, and a backup server. The backup server sends a first request to the first agent for a logical backup data set that is distributed on the plurality of data sources. The first agent, in response to the first request, conveys a first portion of the logical backup data set from a first data source to the backup server and sends a second request for backup data to the second agent. The second agent conveys a second portion of the logical backup data set from a second data source to the first agent in response to the second request.

19 Claims, 14 Drawing Sheets

PROTECTING DATA FOR DISTRIBUTED APPLICATIONS USING COOPERATIVE BACKUP AGENTS

BACKGROUND OF THE INVENTION

1. Field of the Invention

This invention relates to computer systems and, more particularly, to the backup of data used by distributed applications running on a network of computer systems.

2. Description of the Related Art

It has become common for organizations to employ distributed applications installed on a network of computer hosts to manage a wide variety of information that may be critical to their operations. For example, Microsoft Exchange Servers provides an organization with a messaging (e-mail) and collaboration environment. Another example, Microsoft SharePoint® Portal Server, provides a unified view (on a website) of information from various applications. A third example, Microsoft's Distributed File System (DFS) is a distributed application that provides a single name space for combining the views of files on multiple, networked computers into a single, hierarchical view. Additional examples of distributed applications, available from various vendors, are well known to those having ordinary skill in the art.

In order for a distributed application to provide its desired functionality, a set of distributed data sources is generally associated with the distributed application. For example, a distributed application may have access to one or more database repositories, file systems, or other storage media, either local or remote. Generally, a variety of design decisions determine the number and location of data sources associated with a given distributed application. Such decisions may include the quantity of data stored, required frequency of access to the data, network latency between hosts on which the data is stored, and the functionality required of the application software installed on each host.

In addition to the above, distributed applications may utilize a plurality of servers and a plurality of data sources. In such a case, a server typically implements some portion of the functionality of the distributed application. A server may also manage data that is required to provide the functionality it implements and/or functionality implemented by other servers. For example, one type of server may provide services that require access to data stored in data sources and managed by other servers installed on other hosts. In addition, another type of server may manage a data source for other servers residing on other hosts. In general, a distributed application may comprise a plurality of both types of servers. It is also possible for a server to function as both types of servers at the same time.

There may also be associated information, which may be referred to as "metadata", that is stored in a data source on a different host and is required for a server to make use of the data stored on its host. For example, the data in a data source may be encrypted and encryption keys that are needed to decrypt that specific data may be stored in a data source located on a different host. Another example of metadata is a table of user capabilities that may determine what operations each user is permitted to perform on the data of a given data source. The existence of metadata that is associated with data sources results in dependencies between data sources that must be dealt with during backup and restore operations of a distributed application. During a system-wide backup operation, data from multiple data sources, including metadata, may be copied and stored on backup media. It is common for a distributed application to have large amounts of data to be backed up such that multiple backup tapes or other media may be required in order to hold all of the data from multiple data sources. A time consuming system-wide restoration may be required to restore all of the metadata necessary to make even a selected portion of the backup data useable.

In order to avoid the loss of important data associated with an organization's distributed applications, a data protection application may be employed to manage backup and restore operations for the data and its associated metadata. It is often desirable to restore data to a selected portion of the data sources associated with a distributed application, for example, in the event of the failure of a single host. However, in order to restore selected data to a useable state, it may be necessary to restore metadata associated with the data as well. Unfortunately, the metadata of interest may not be stored in the same place as the selected portion of the data, making a selective restoration operation complex and inefficient.

In view of the above, an effective system and method for backup and restore of distributed application data is desired.

SUMMARY OF THE INVENTION

Various embodiments of a computer system are disclosed. In one embodiment, the computer system includes a first agent on a first host, a second agent on a second host, a plurality of data sources, and a backup server. The backup server may be configured to send a first request for a logical backup data set, said logical backup data set comprising data distributed on the plurality of data sources. The first agent, in response to the first request, may be configured to convey a first portion of the logical backup data set from a first data source of the plurality of data sources to the backup server and to send a second request for backup data to the second agent. The second agent, in response to the second request, may be configured to convey a second portion of the logical backup data set from a second data source of the plurality of data sources to the first agent. In one embodiment, the first agent is further configured to convey the second portion of the logical backup data set to the backup server.

In some embodiments, the second request identifies at least a subset of the data stored on the second data source. The second agent, in response to the second request, may be configured to convey the subset of the data stored on the second data source to the first agent.

In other embodiments, the backup server may be configured to convey the first and second portions of the logical backup data set to the first agent. The first agent may be configured to cause a restoration of the first portion of the logical backup data set to the first data source and convey the second portion of the logical backup data set to the second agent. The second agent may be configured to cause a restoration of the second portion of the logical backup data set to the second data source.

These and other embodiments will become apparent upon consideration of the following description and accompanying drawings.

Figure 1:
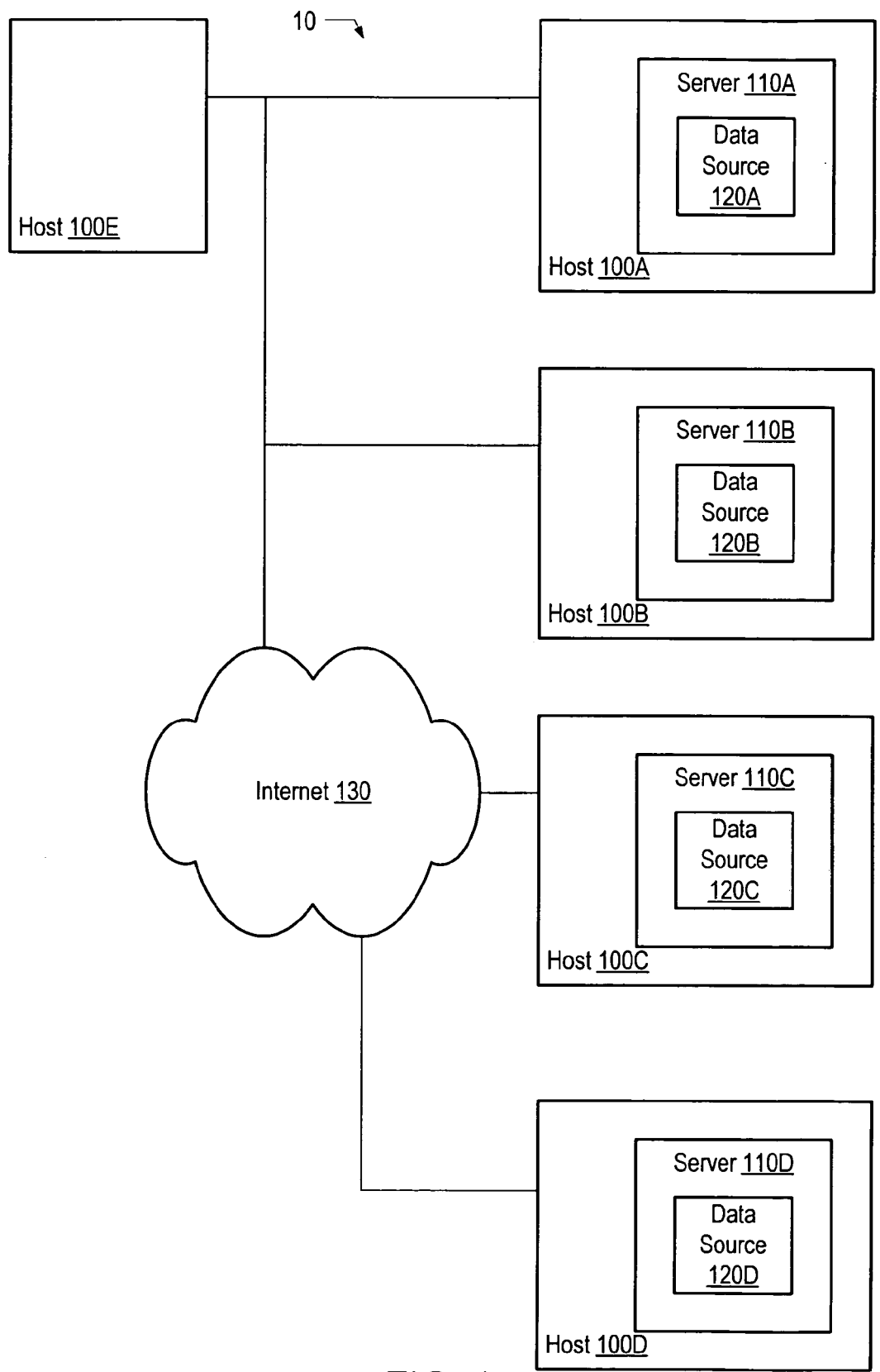
FIG. 1 illustrates an overview of a network including interconnected computer hosts on which may be installed a distributed application.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates an overview of a network 10 including interconnected computer hosts 100A-100E on which may be installed a distributed application 110 comprising servers 110A-110D. In one embodiment, one or more of the hosts may be interconnected via an external network (for example, the Internet) 130. Each host of network 10 may be a computer system including one or more processors and one or more data storage devices, running an operating system and various application programs such as the servers 110A-110D of application 110. As shown, each of servers 110A-110D may include a respective data source 120A-120D. Data sources 120A-120D, in some embodiments, may include at least one of a database, a file system, a non-volatile memory, or any other suitable data storage device. Elements referred to herein with a particular reference number followed by a letter will be collectively referred to by the reference number alone. For example, hosts 110A-110E may be collectively referred to as hosts 110.

Servers 110A-110D may be configured to deliver a variety of services for application 110 that include processing, storing, and retrieving data from data sources 120A-120D. In one embodiment, one or more of servers 110A-110D may be a "DataServer" (e.g., may include one of data sources 120 that is a database), and may be responsible for managing storage and retrieval operations on that database on behalf of other servers of application 110. In addition to including one or more DataServers, one or more of servers 110A-110D may be ApplicationServers that have data stored on a different one or more of servers 110A-110D.

One embodiment of distributed application 110 may have components installed on hosts 100A-100E as follows. A server, for example server 110C, may be a web server that provides web content to visitors to various web sites. Server 110C may store some data locally in data source 120C (for example, error logs, performance settings, security settings, etc.). Server 110C may also store the bulk of its data (for example, web content) in a database on another host served by another server, for example, data source 120A and server 110A respectively. Distributed application 110 may have another server that is an ApplicationServer, for example server 110B, to provide other services, such as data encryption/decryption, configuration management, indexing content for later searches, analyzing web traffic patterns, failover management, and other functions common to the distributed application environment. Server 100B may store data in a local file system, for example, data source 120B, such as encryption keys, configuration tables, search index results, web traffic statistics, and network status information, among others. Since distributed applications may utilize multiple databases, another server, for example server 110D, may be a DataServer. Accordingly, server 120D may provide data management services to the servers of distributed application 110 that store data in data source 110D. In this embodiment, data source 110D may be a database containing data such as user authentication and capabilities data. Numerous other distributed applications may be installed on network 10 in various configurations, with various numbers of DataServers and ApplicationServers, depending on the desired functionality, hardware availability, reliability requirements, number of users, and other factors.

In the event of a failure of a single host or server, for example server 110A on host 100A operating as a DataServer for a database residing in data source 120A, it is desirable to restore the data set of data source 120A from a backup copy. Although it may be possible to restore the data set of data source 120A without restoring data sets from other sources, there may be additional data (e.g., metadata or other associated data) from other data sources that is required in order for distributed application 110 to use the backup data set of data source 120A. For example, distributed application 110 may require encryption keys stored in data source 120B in order to decrypt data from the database of data source 120A. In the event that encryption keys are frequently changed, it may be necessary to restore data source 120B's data set from a backup copy to obtain the proper encryption keys needed to decrypt a restored data set of data source 120A. Numerous additional examples are possible in which data associated with one or more of data sources 120A-120D may be distributed among several other data sources. In the following discussion, methods and mechanisms for performing backup and restore operations are described. Generally speaking, as used herein, "associated data" may refer to any data, including metadata, which is associated with or related to some other data in some manner.

FIGS. 2A-2D illustrate one embodiment of a scenario in which a backup operation is performed. In one embodiment, distributed data protection application 200 comprises agents 200A-200D and backup server 200E. In addition, each of hosts 100A-100D may host a respective agent 200A-200D and host 100E may host backup server 200E. Host 100E may also be coupled to backup medium 220. In operation, backup server 200E may store backup data on and retrieve backup data from backup medium 220. Agents 200A-200D may be responsible for collecting and forwarding data to backup server 200E. In one embodiment, network 10 may host both distributed application 110 as described in FIG. 1 and distributed data protection application 200 as described above. More specifically, each host 100A-100D may host a respective agent 200A-200D, server 110A-110D, and data source 120A-120D. In addition, each server 110A-110D may provide a lock 210A-210D that permits the internal state of the respective data source 120A-120D to be preserved. Distributed application 110 may provide locking API 240 through which other applications or processes may cause each of locks 210A-210D to operate. Distributed application 110 may be configured to provide locking API 240 on the same host as a web server (for example, server 110C may be a web server on host 100C). Accordingly, in one embodiment of distributed data protection application 200, agent 200C may function as an arbiter to forward lock instructions received from other agents or from backup server 200E to locking API 240. A distributed application may also include an "ApplicationServer" that provides query and control methods for other servers to access their related data that may be stored on multiple additional servers. For example, in one embodiment, Microsoft's SharePoint® Portal Server may be configured with an ApplicationServer that coordinates queries for data related to the data managed by multiple DataServers. In order for one of these DataServers to find a set of related data, it must generally communicate with the coordinating ApplicationServer. Accordingly, in one embodiment, server 110C may function as a coordinating ApplicationServer and agent 200C may forward data queries from other agents to server 110C. In the descriptions and examples that follow, such a hosting configuration is assumed for purposes of discussion.

Figure 2A:
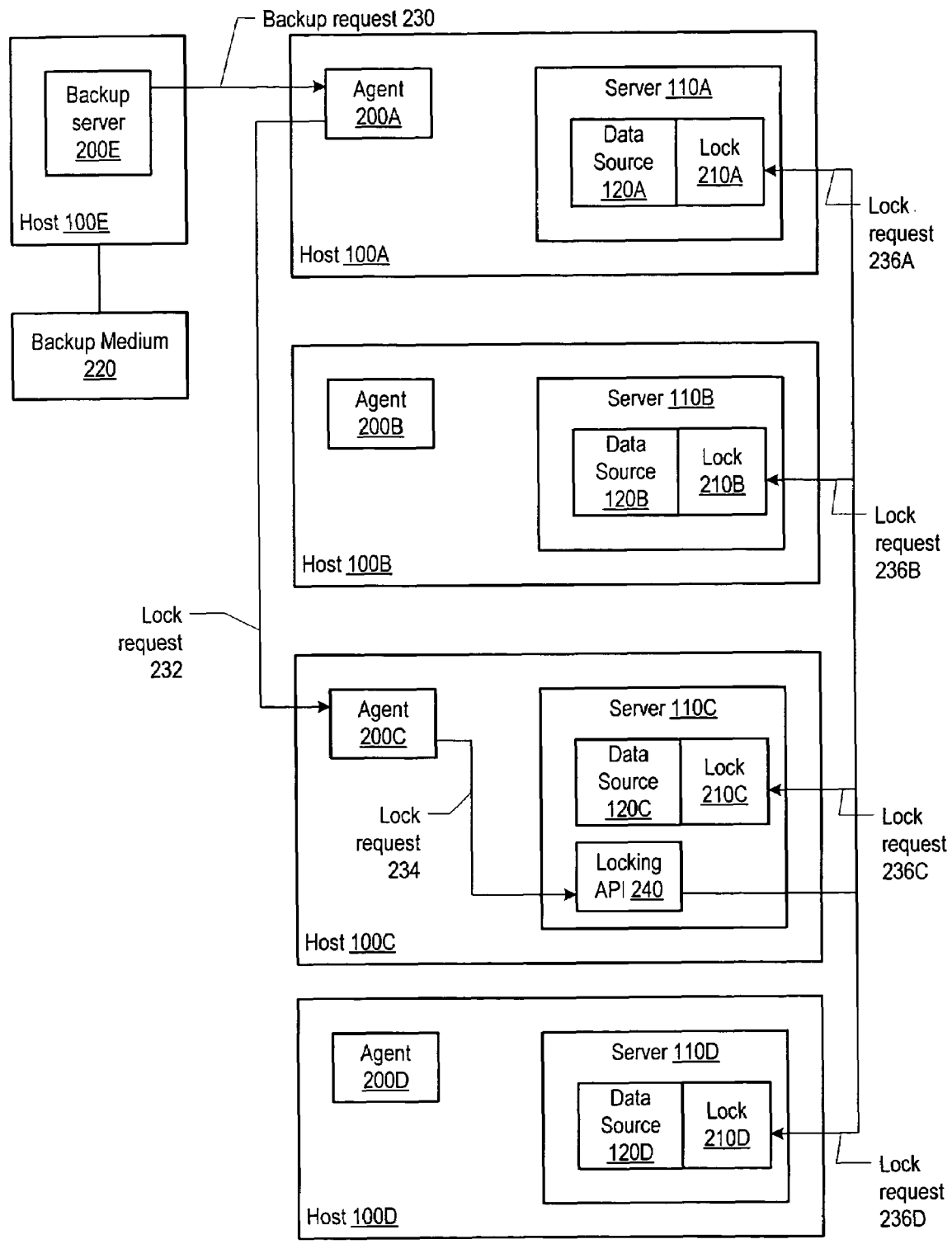
FIG. 2A illustrates one embodiment of a procedure that may be used to lock an internal state of data sources associated with a distributed application.

FIG. 2A illustrates a procedure that may be used by distributed data protection application 200 to lock an internal state of data sources associated with distributed application 110 during a backup operation. As shown, backup server 200E may initiate a backup operation to backup a data source. For example, backup server 200E may send backup request 230 to agent 200A to initiate a backup of the data set of data source 120A. Agent 200A may respond by sending lock request 232 to agent 200C. Agent 200C may respond by sending lock request 234 to locking API 240 of distributed application 110. Distributed application 110 may send lock requests 236A-236D to each of locks 210A-210D. A more detailed description of the lock operation is given below. Once the lock operation is completed, agent 200A may proceed to a data request phase of the backup operation, described below.

Figure 2B:
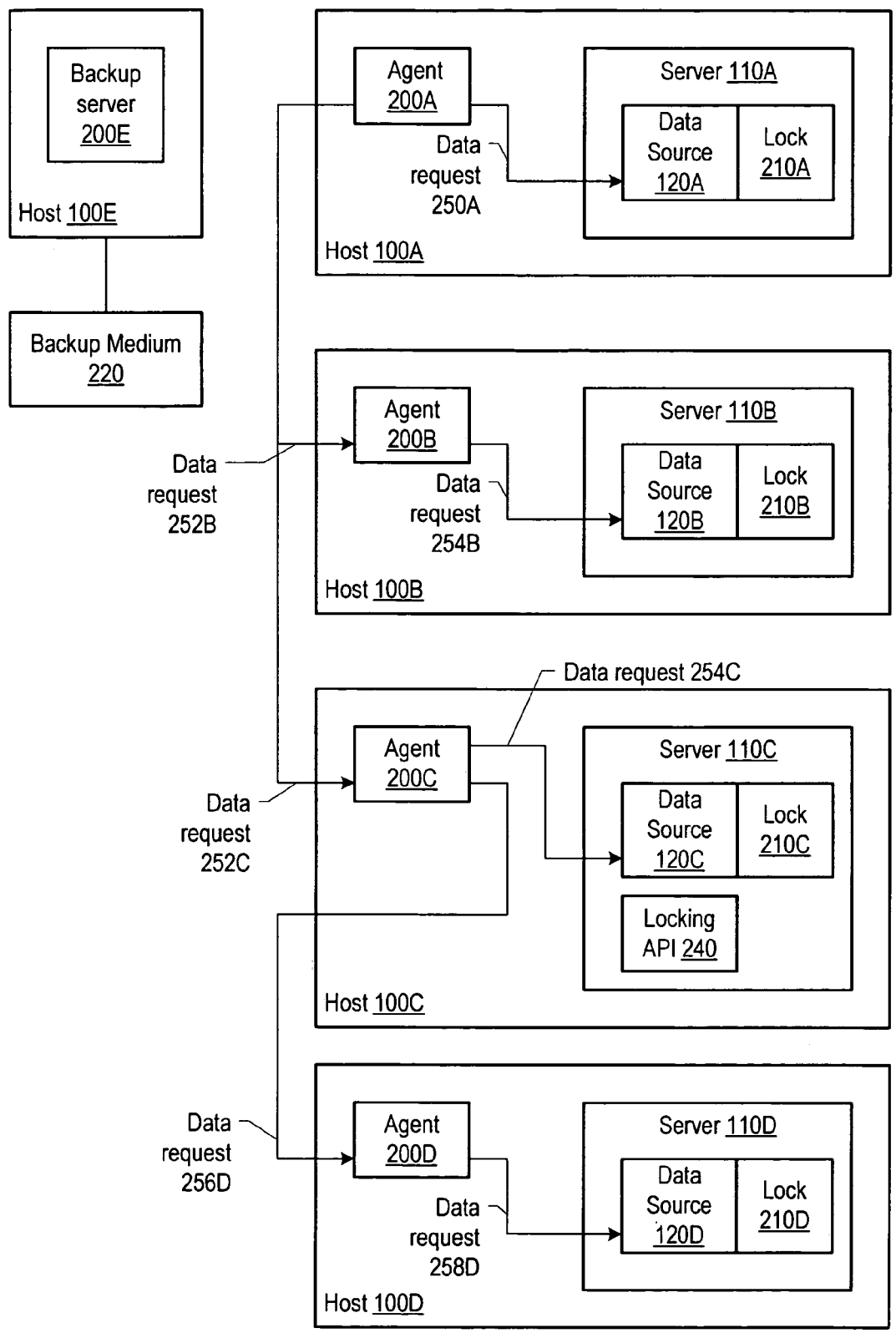
FIG. 2B illustrates one embodiment of a procedure that may be used to request a logical backup data set from a distributed application.

FIG. 2B illustrates one embodiment of a procedure that may be used by distributed data protection application 200 to request a "logical" backup data set from distributed application 110. Generally speaking, a logical backup data set comprises a grouping of associated data that may or may not be inherently related. For example, a logical backup data set may comprise data and corresponding encryption keys. Alternately, any arbitrary grouping of data may be associated and defined as a logical backup data set. Such data may be stored in a single location, or distributed.

In the illustrated embodiment, it is assumed that a backup of data source 120A has been requested and that the internal state of data sources 120A-120D has been locked. During a data request phase of the backup operation, agent 200A may send data request 250A to data source 120A. In addition, agent 200A may send further data requests 252B and 252C to agents 200B and 200C, requesting data associated with data stored in data source 120A. Agent 200B may respond by sending data request 254B to data source 120B. Agent 200C may respond by sending data request 254C to data source 120C. In one embodiment, agent 200C may have access to information from distributed application 110 indicating that there is additional data associated with data stored in data source 120A on another server (for example server 110D) unknown to agent 200A. Therefore, agent 200C may also send a data request 256D to agent 200D requesting additional associated data. Finally, agent 200D may send data request 258D to data source 120D.

Figure 2C:
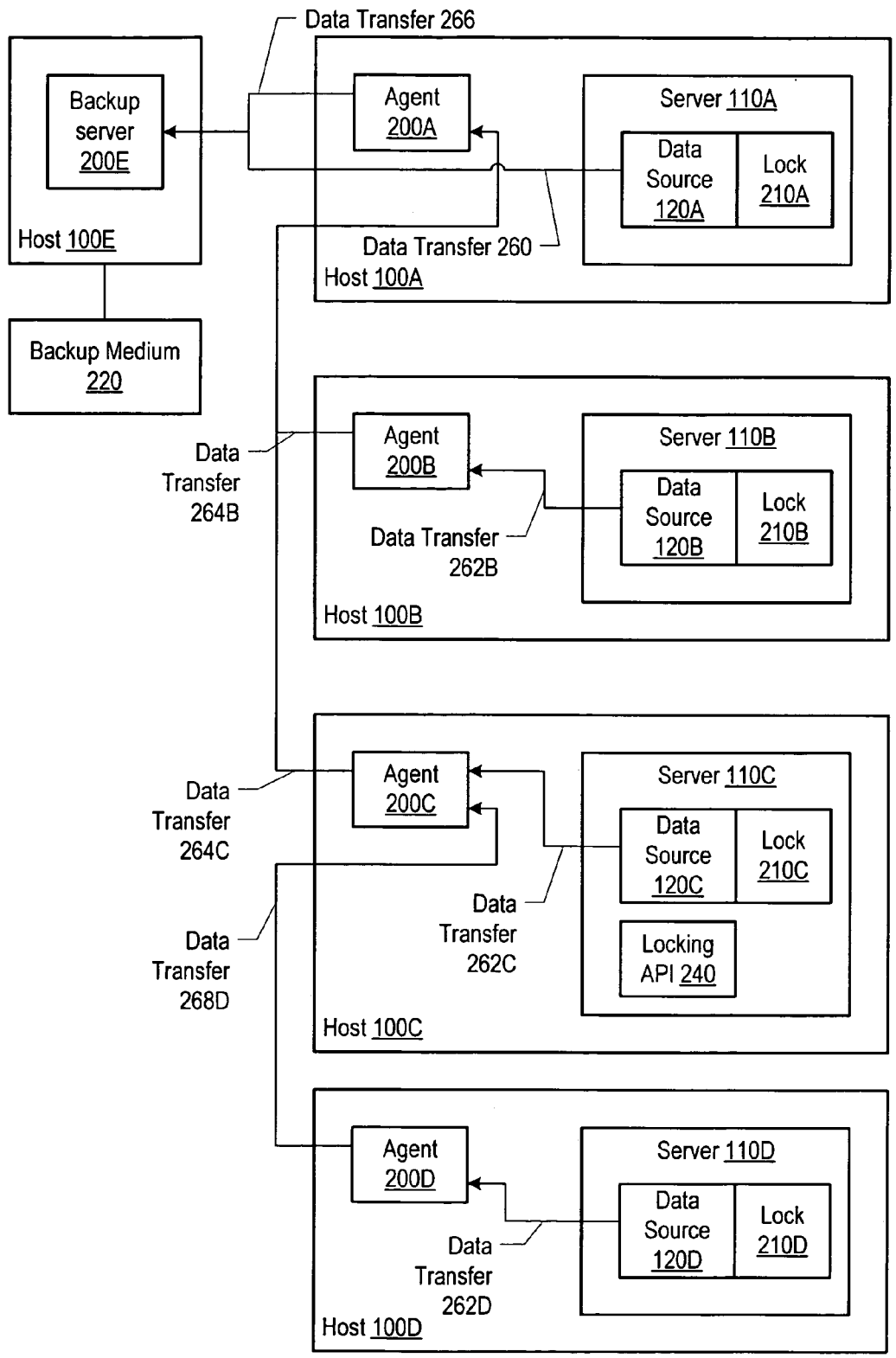
FIG. 2C illustrates one embodiment of the conveyance of portions of a logical backup data set to a backup server.

FIG. 2C illustrates one embodiment of data transfers that may be used by distributed application 110 and distributed data protection application 200 to convey portions of a logical backup data set to backup server 200E. In the illustrated embodiment, it is assumed that a logical backup data set of data source 120A has been requested and the internal state of data sources 120A-120D has been locked in accordance with the descriptions of FIGS. 2A and 2B. Data source 120A may be a database storing a large quantity of data to be copied and conveyed to the backup server during a backup operation. Therefore, in one embodiment, agent 200A may cause a direct data transfer 260 between data source 120A and backup server 200E so as to avoid the network delay incurred during the conveyance of a large quantity of data from data source 120A to agent 200A to the backup server. Other data sources may host data that is associated with data stored on data source 120A. In a typical distributed application, the quantity of associated data is small compared to the data set to which the data is associated. Therefore, other agents may convey associated data, forming the remainder of the logical backup data set, to agent 200A, which may forward the associated data to backup server 200E via data transfer 266. For example, data source 120B may convey data associated with data stored on data source 120A to agent 200B via data transfer 262B. Agent 200B may, in turn, convey this associated data to agent 200A via data transfer 264B. Similarly, data source 120C may convey data associated with data stored on data source 120A to agent 200C via data transfer 262C. Agent 200C may, in turn, convey this associated data to agent 200A via data transfer 264C. In addition, data source 120D may convey data associated with data stored on data source 120A to agent 200D via data transfer 262D. Agent 200D may, in turn, convey this associated data to agent 200C via data transfer 268D. Agent 200C may combine this associated data with associated data received from data source 120C and forward the resulting associated data to agent 200A via data transfer 264C. As previously noted, agent 200A may forward the accumulated associated data to backup server 200E via data transfer 266, completing the data collection phase of the backup operation.

Figure 2D:
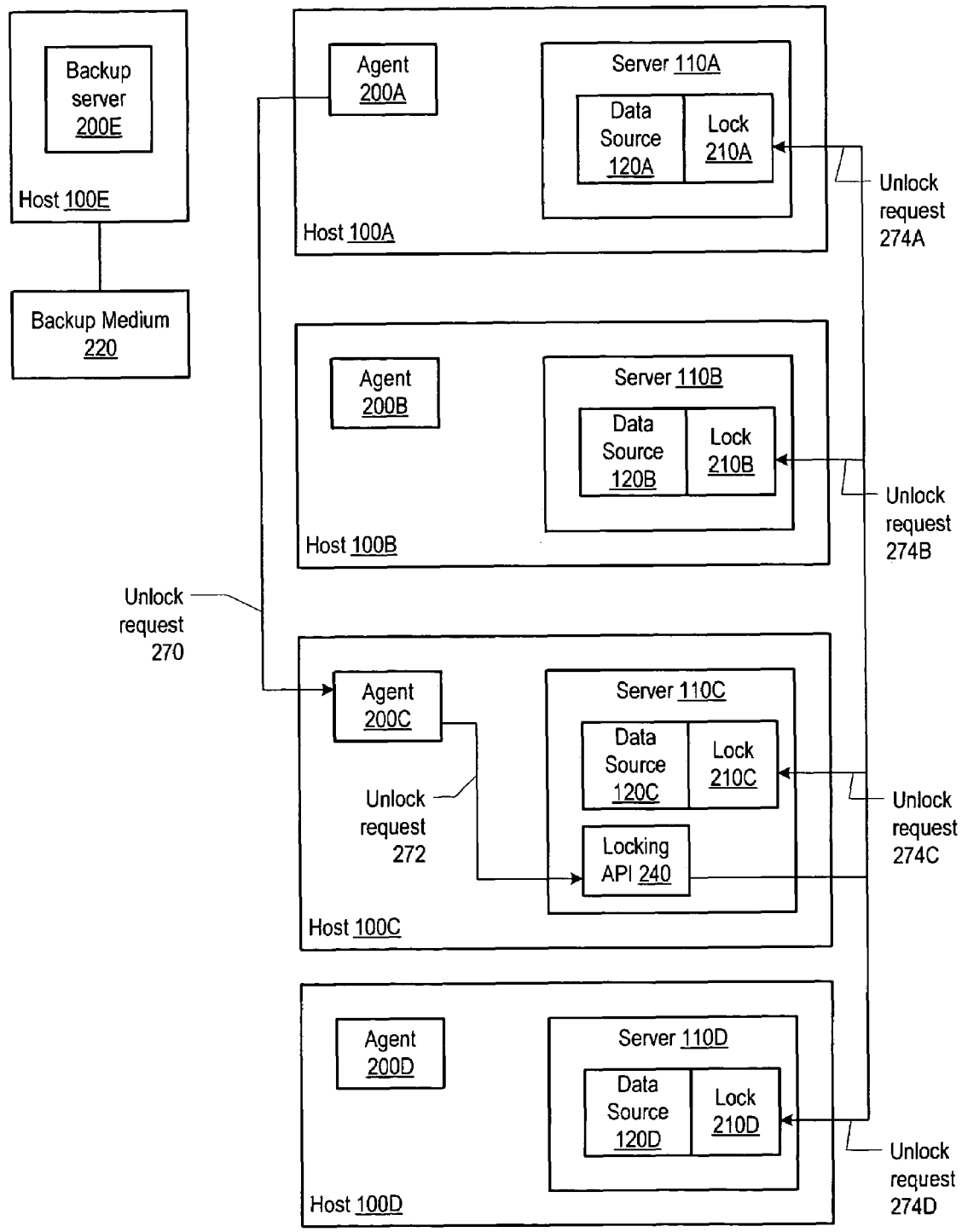
FIG. 2D illustrates one embodiment of a procedure that may be used to unlock an internal state of data sources associated with a distributed application.

FIG. 2D illustrates a procedure that may be used by distributed data protection application 200 to unlock an internal state of data sources associated with distributed application 110 upon completion of a backup operation. As shown, agent 200A may initiate an unlock sequence by sending unlock request 270 to agent 200C. Agent 200C may respond by sending unlock request 272 to locking API 240 of distributed application 110. Distributed application 110 may send unlock requests 274A-274D to each of locks 210A-210D. A more detailed description of the lock operation is given below.

Figure 3:
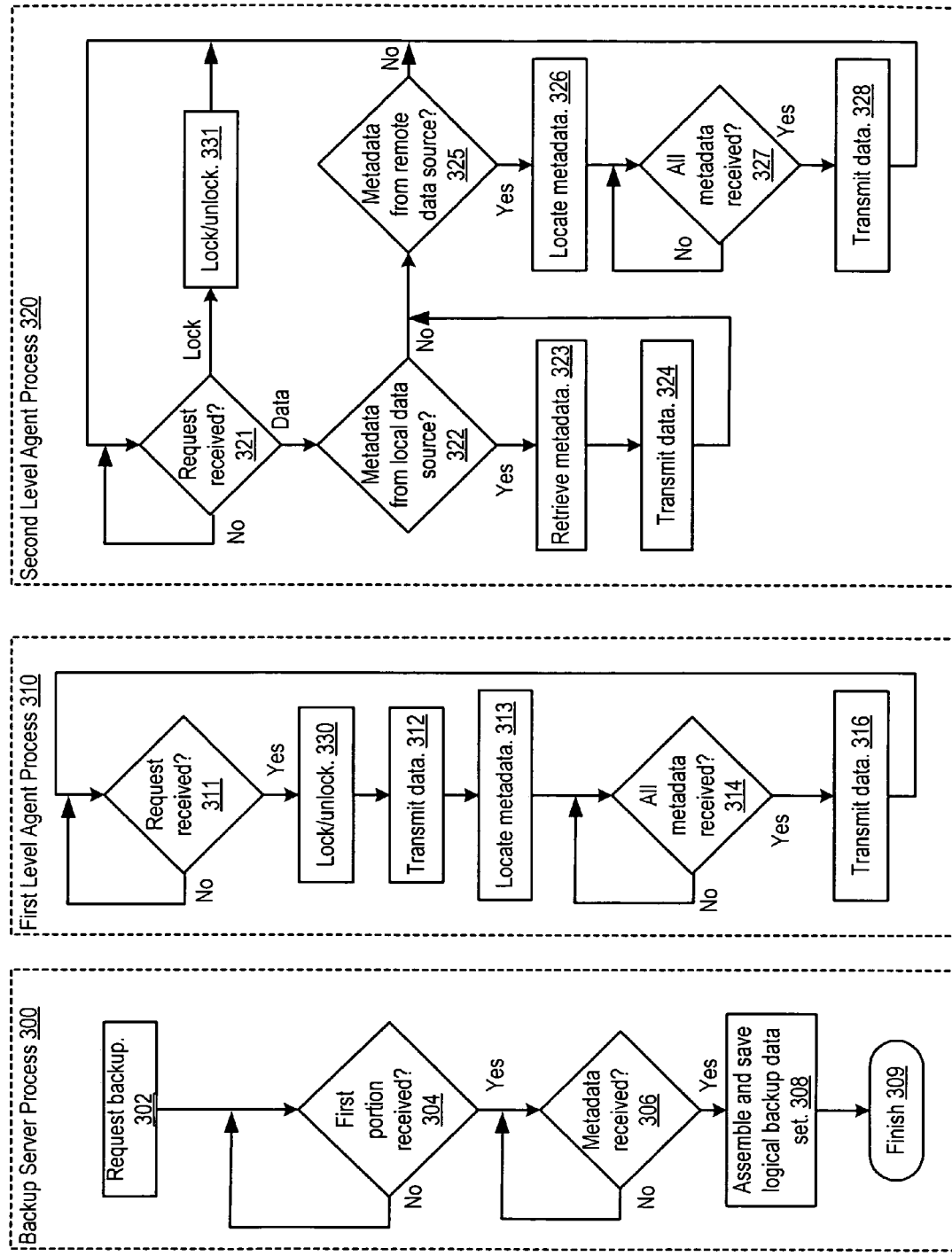
FIG. 3 is a flow chart depicting one embodiment of processes which may be performed by a distributed data protection application during a backup operation.

Turning now to FIG. 3, one embodiment of a flow chart of processes that may be executed during a backup operation is shown. As shown, application 200 may include processes 300-320. During a backup operation a backup server, such as server 200E, may execute process 300. Also, process 310 may be executed by one or more "first-level" agents. For example, a selected agent that is associated with a database and that receives a request from a backup server for a logical backup data set (for example, agent 200A) or an agent that receives a request for data managed by its associated server (for example, agents 200B and 200D) may execute process 310. Generally speaking, a first-level agent is an agent which receives a data request directly from a backup server rather than through an intermediate agent. In addition, process 320 may be executed by one or more "second-level" agents (i.e., agents which generally receive data requests via another agent). For example, an agent that provides the service of locating associated data for other agents and/or an agent on a host that hosts a locking API of a distributed application (such as agent 200C) may execute process 320. In general, any number of "levels" of agents may be involved. For example, a first-level agent may convey a request to a second-level agent, which in turn may convey a request to a third-level agent. However, for simplicity of discussion, all second and lower level agents may generally be referred to as second-level agents.

In the embodiment shown, a backup server may request a backup (block 302) corresponding to a logical backup data set (for example, the data stored in data source 120A and its associated data stored in other data sources) by sending a backup request to the agent that is associated with the selected data source. Subsequent to initiating the request, the backup server may wait for a first portion of the logical backup data set to be returned from the data source (decision block 304). Following receipt of the first portion (304), loop 306 indicates monitoring reception of additional portions of the logical backup data set (associated data) from the selected agent. In response to receiving the first portion of the logical backup data set and any associated data, the backup server may store the result (block 308) as a logical backup data set on a backup medium such as backup medium 220. In some embodiments, the backup server may combine the first portion of the logical backup data set with its associated data prior to storage. In some embodiments, an unlock request may be sent (block 308) to an agent associated with the locking API of a distributed application. Finally, an acknowledgement of unlock completion may be received (block 309). A detailed description of the lock/unlock process is given below.

Continuing to refer to FIG. 3, in one embodiment, a first-level agent may wait for a request for backup data (loop 311). Following receipt of a request, in order to ensure that the internal state of the data sources remains quiescent, the first-level agent may request a lock of the internal state of the data set (block 330). Once the internal state of the data sources has been locked, the first-level agent may convey a portion of the logical backup data set comprising the data stored in its local data source to a backup server (block 312). Typically, in a distributed application, the local data source may not contain all portions of the desired logical backup data set. Accordingly, the first-level agent may locate servers and their agents that store data associated with data stored in the local data source and transmit a data request to each of these agents (block 313). Once these data requests have been sent, the first-level agent may wait for the requested data to be returned (loop 314). Upon receiving the requested data, the first-level agent may convey the collected data to the backup server (block 316).

Again referring to FIG. 3, an agent that operates at a second level of a distributed data protection application may execute process 320. In the illustrated embodiment, the second-level agent may detect a request (loop 321) from a first-level agent executing process 310. Following receipt of a lock or an unlock request, the second-level agent may forward a corresponding lock or unlock request to a locking API (block 331). Upon completion of the lock/unlock process, the second-level agent may detect corresponding data requests (loop 321). Upon receipt of a data request, the second-level agent may determine if there is corresponding local associated data (e.g., metadata) which corresponds to the request (decision block 322). If so, the second-level agent may retrieve the data (block 323) and convey it back to the first-level agent from which the original data request was received (block 324). Upon completion of block 324, or if there is no local data to be retrieved, the second-level agent may determines if there is corresponding data to be retrieved from other agents and their associated data sources (decision block 325). If so, the second-level agent may locate the agents having data of interest and send a data request to each of these agents (block 326). Once these data requests have been sent, the second-level agent may monitor the return of requested data (loop 327). Upon receiving and collecting the requested data, the second-level agent may convey the collected data to the first-level agent that sent the original data request (block 328), thereby completing process 320.

Numerous alternative embodiments are possible. In some embodiments, one second-level agent may execute process 320 in order to provide access to the locking API. Another second-level agent may execute process 320 in order to provide access to the distributed application's associated data query functionality. In further embodiments, a backup server executing process 300 may request a backup of a data source on a host that also hosts a second-level agent executing process 320 without involving a first-level agent. In still further embodiments, the number of first- and second-level agents may vary depending on the configuration and scale of the distributed application. Also, in alternative embodiments, second-level agents may be configured to convey data directly to a backup server.

Figure 4:
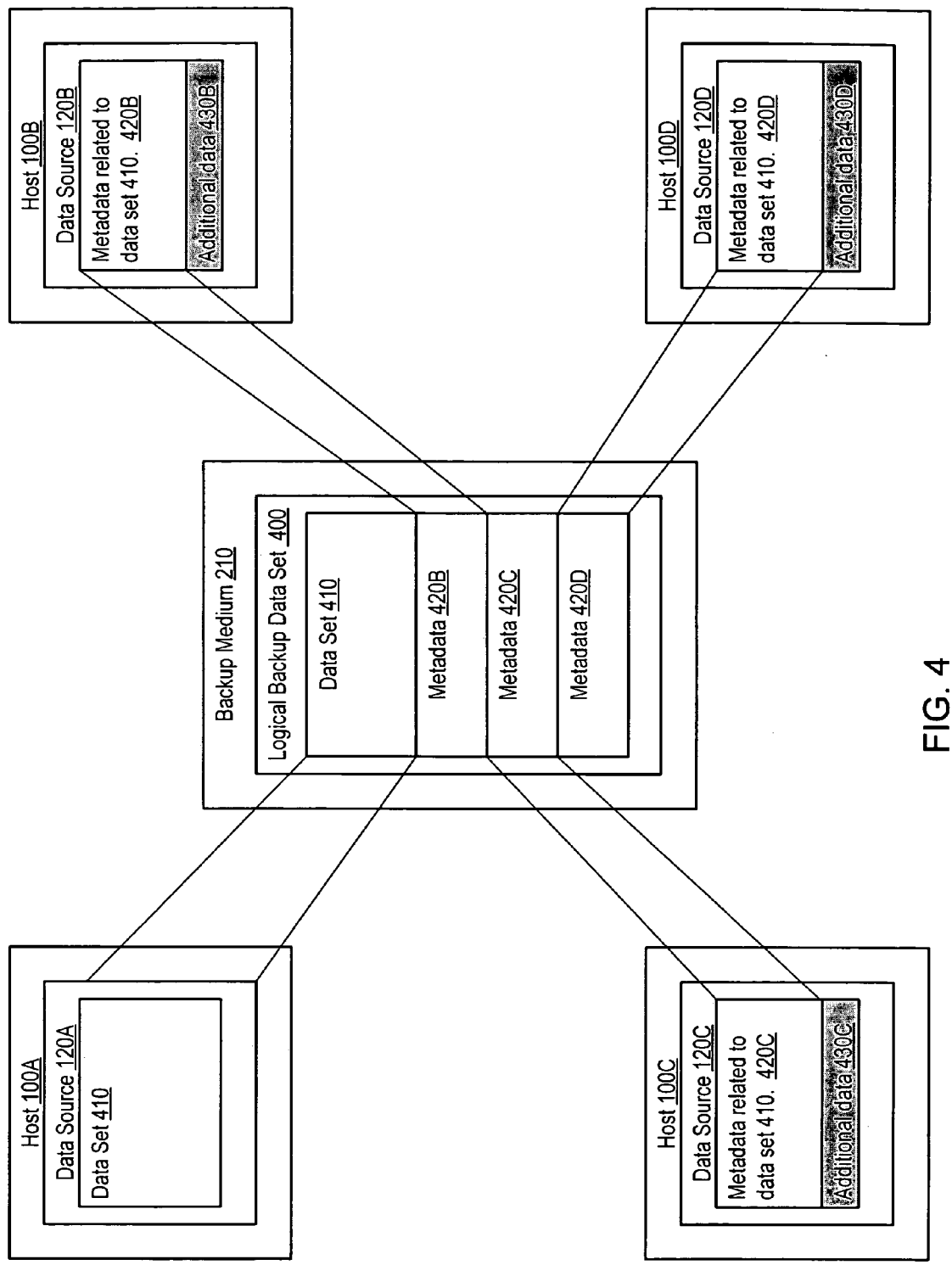
FIG. 4 illustrates one example of a logical backup data set.

FIG. 4 illustrates one example of the composition of a logical backup data set that may be assembled by distributed data protection application 200 during a backup operation. In the illustrated example, each of hosts 100A-100D includes a respective data source 120A-120D. Portions of the data stored in each data source may be combined to form logical backup data set 400. For example, in one embodiment, data source 120A may be a database in which is stored data set 410. Each of data sources 120B-120D may also store a data set comprising data that is associated (either inherently or arbitrarily) with data set 410, (420B-420D respectively), along with additional data that may be unrelated to data set 410 (430B-430D, respectively). As shown, upon completion of a backup operation, backup medium 210 may store logical backup data set 400, which may comprise data set 410 and data 420B-420D, excluding additional data 430B-430D.

Figure 5:
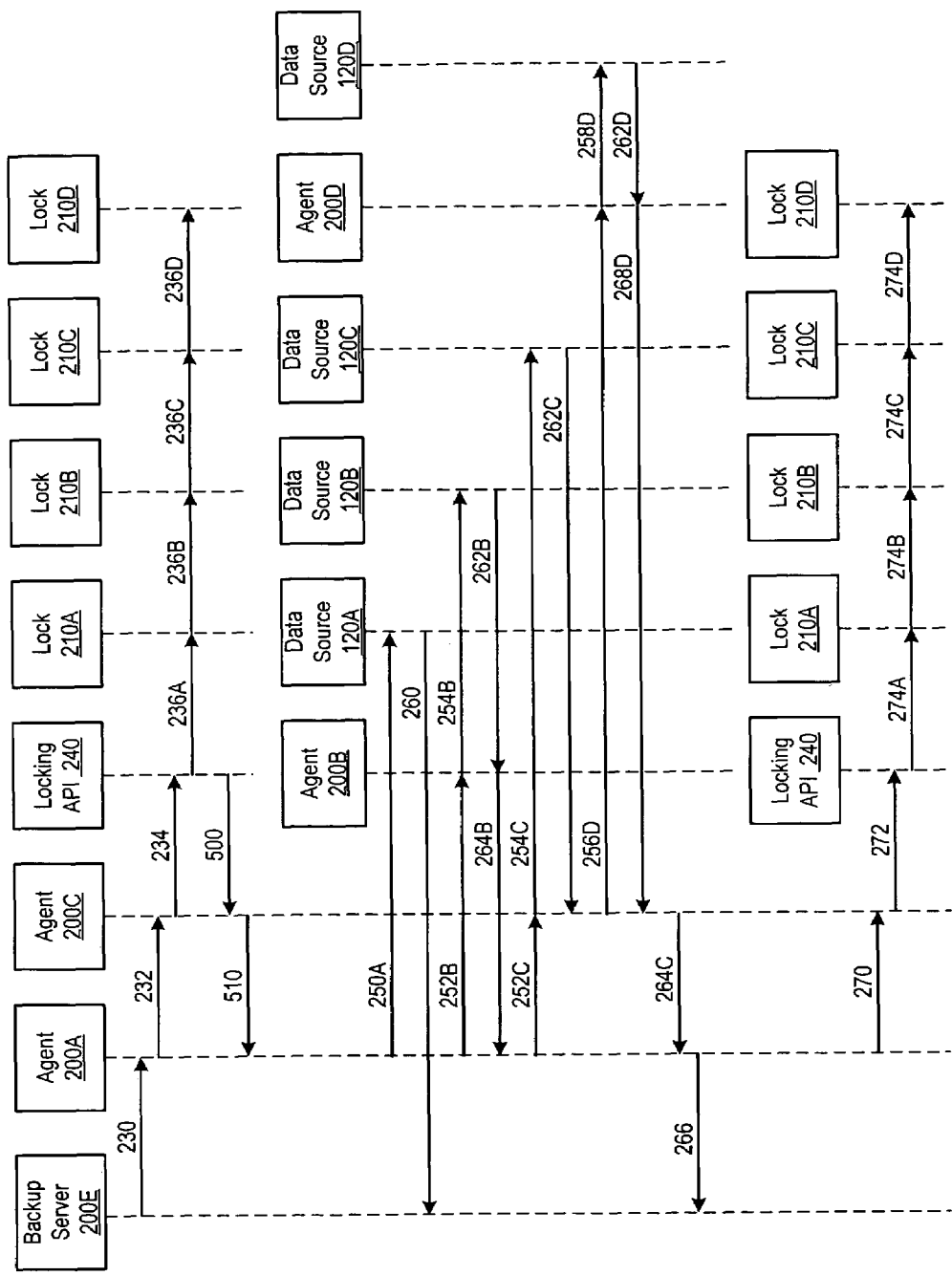
FIG. 5 illustrates one embodiment of a sequence diagram corresponding to a backup of a data source.

FIG. 5 illustrates one embodiment of a sequence diagram corresponding to a backup of data source 120A, using the combined features illustrated in FIGS. 2A-2D and 3. Depending on the configuration of the distributed application of which data source 120A is a part, numerous variations are possible involving associated data stored on additional data sources, communication with additional agents, and communication with various APIs of the distributed application such as a locking API. In the illustrated embodiment, data source 120A stores a data set that is associated with data located on data sources 120B-120D. Data sources 120A-120D together store the data used by a distributed application. Agent 200A may have access to information from the distributed application indicating that there is data stored on data sources 120B and 120C related to the data set stored on data source 120A. Agent 200A may also have access to information from the distributed application indicating that agent 200C is installed on a host that has access to a locking API for the distributed application that may lock an internal state of data sources 120A-120D. Agent 200A may also have access to information from the distributed application indicating that agent 200C is able to query other data sources through the distributed application to find additional data associated with the data set stored on data source 120A.

As shown in FIG. 5, a backup operation to backup data source 120A may be initiated by backup server 200E sending backup request 230 to agent 200A. In response, agent 200A may initiate a locking sequence by sending lock request 232 to agent 200C. Agent 200C may signal locking API 240 via lock request 234 to lock the internal state of data sources 120A-120D via respective lock requests 236A-236D. Upon completion of the lock process, locking API 240 may send lock complete signal 500 to agent 200C, which, in response, may send lock complete signal 510 to agent 200A. At this point agent 200A may begin to request portions of the logical backup data set.

Continuing to refer to FIG. 5, once the internal state of data sources 120A-120D is locked, agent 200A may send data requests 250A, 252B, and 252C to data source 120A, agent 200B, and agent 200C respectively. Data request 250A may elicit data transfer 260 through which the largest portion of the logical backup data set may be conveyed from data source 120A to backup server 200E. Data request 252B may cause agent 200B to send data request 254B to data source 120B. Data source 120B may respond via data transfer 262B through which data may be conveyed to agent 200B. In response, agent 200B may forward the data via data transfer 264B to agent 200A. Similarly, data request 252C may cause agent 200C to send data request 254C to data source 120C. Data source 120C may respond via data transfer 262C through which data may be conveyed to agent 200C. Agent 200C may also send data request 256D to agent 200D, causing agent 200D to send data request 258D to data source 120D. Data source 120D may respond via data transfer 262D through which data may be conveyed to agent 200D. In response, agent 200D may forward the data via data transfer 268D to agent 200C. In response, agent 200C may combine the data received via data transfers 262C and 268D and convey the result via data transfer 264C to agent 200A. Agent 200A may forward the received data via data transfer 266 to backup server 200E. Once backup server 200E has received all portions of the logical backup data set, it may cause agent 200A to send unlock request 270 to agent 200C, which may signal locking API 240 via unlock request 272 to unlock the internal state of data sources 120A-120D via respective unlock requests 274A-274D.

Figure 6A:
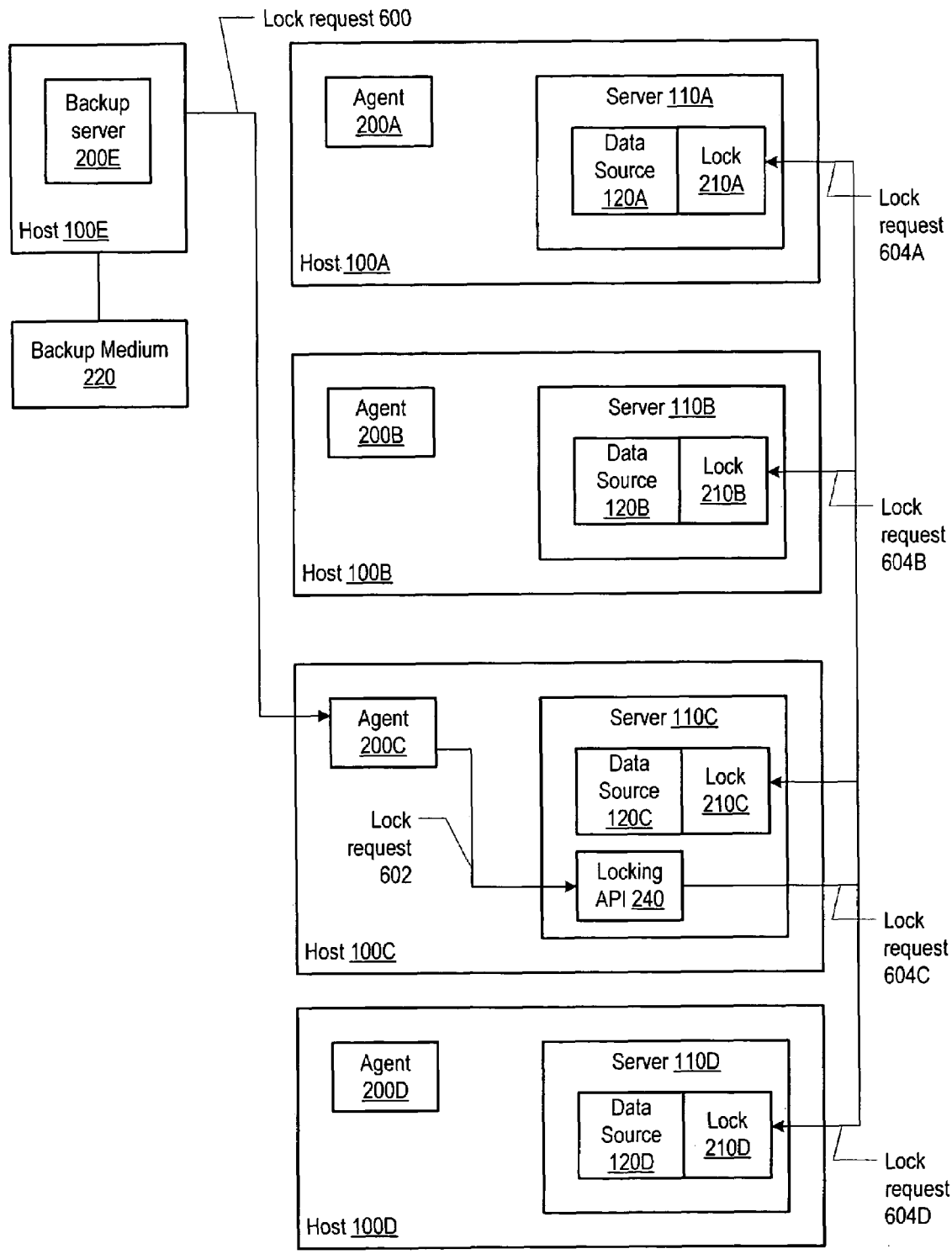
FIG. 6A illustrates one embodiment of a procedure that may be used to lock an internal state of a data set associated with a distributed application.
Figure 6B:
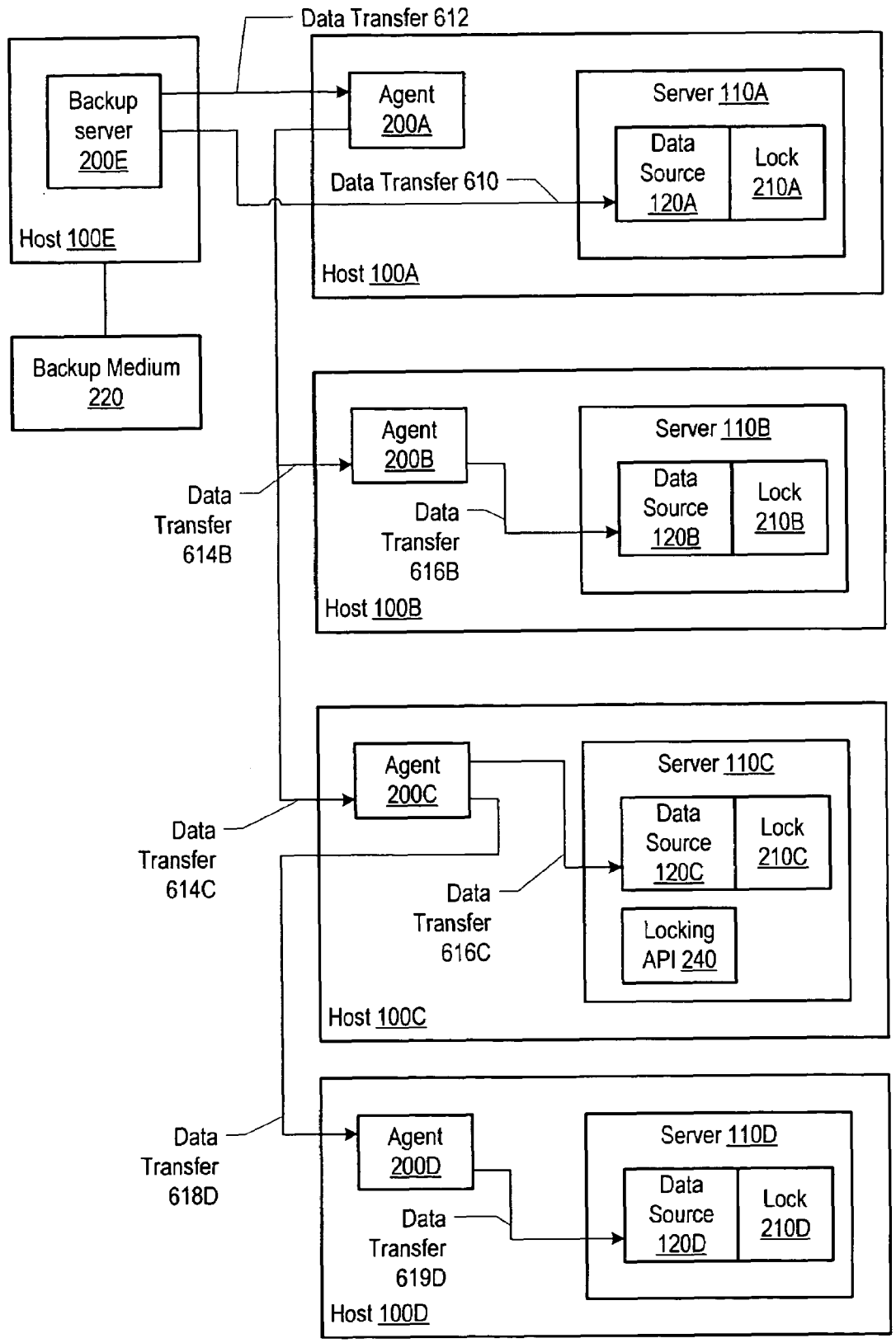
FIG. 6B illustrates one embodiment of data transfers to restore portions of a logical backup data set from a backup server to a distributed application.
Figure 6C:
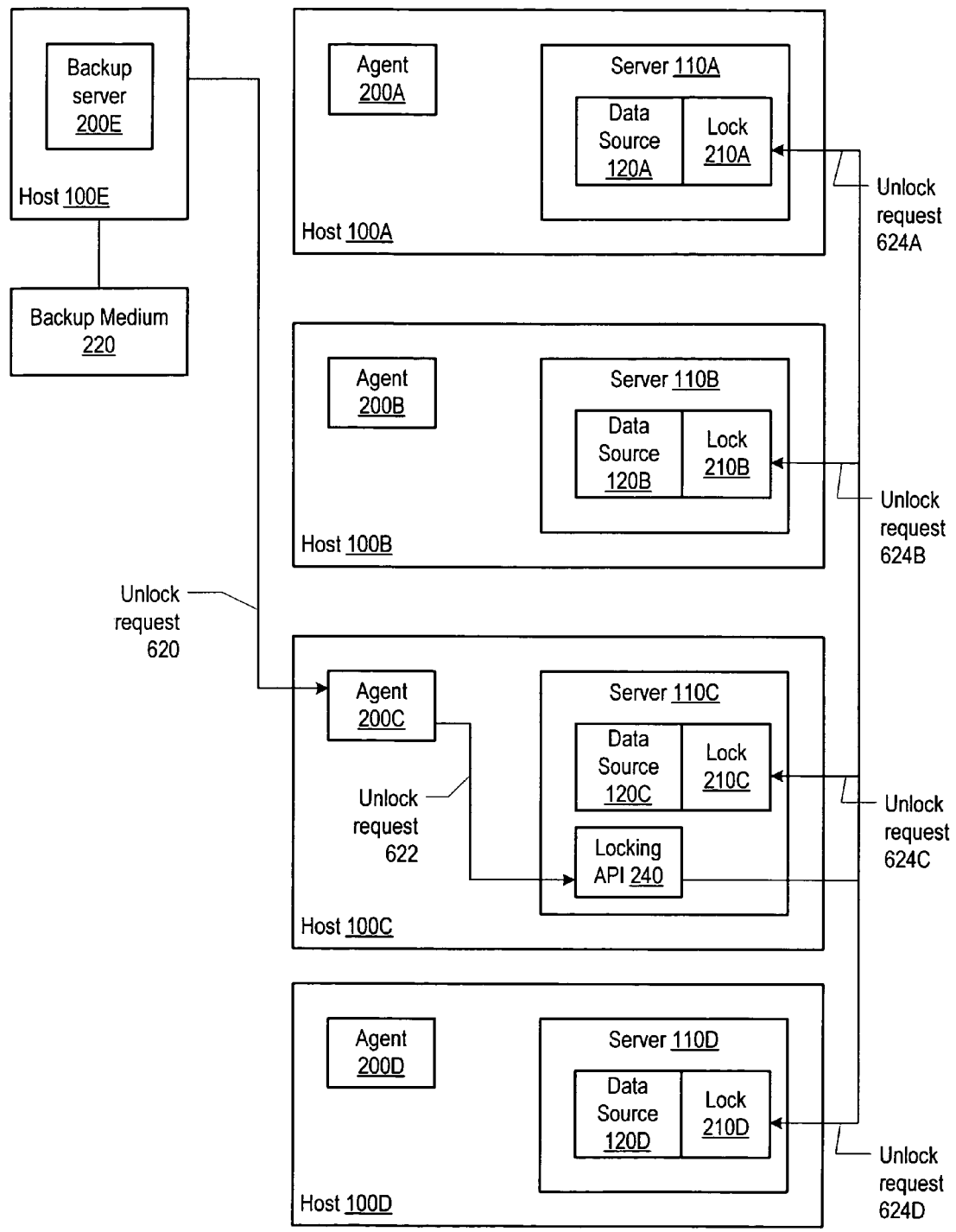
FIG. 6C illustrates one embodiment of a procedure that may be used to unlock an internal state of data sources associated with a distributed application.

FIGS. 6A-6C illustrate one embodiment of a restore scenario in which a logical backup data set is restored to a distributed application. In the illustrated embodiment, the components of distributed application 110 and distributed data protection application 200 are identical to those shown in FIG. 2A.

FIG. 6A illustrates a procedure that may be used by distributed data protection application 200 to lock an internal state of a data set associated with distributed application 110 during a restore operation following steps that are similar to those illustrated in FIG. 2A. As shown, backup server 200E may initiate a restore operation to restore a data source 120A. For example, backup server 200E may send lock request 600 to agent 200C to initiate a restoration of the data set of data source 120A. Agent 200C may respond by sending lock request 602 to locking API 240 of distributed application 110. Distributed application 110 may send lock requests 604A-604D to each of locks 210A-210D. A more detailed description of the lock operation is given below. Once the lock operation is completed, backup server 200E may proceed to the data transfer phase of the restore operation, described below.

FIG. 6B illustrates one embodiment of data transfers that may be used by distributed data protection application 200 to restore portions of a logical backup data set from backup server 200E to distributed application 110. In the illustrated embodiment, it is assumed that prior to the restoration, a logical backup data set of data source 120A has been saved on backup medium 220 in accordance with the example illustrated in FIGS. 2-5. Data source 120A may be a database from which a large quantity of data may have originated. Therefore, backup server 200E may cause direct data transfer 610 to data source 120A so as to avoid the network delay incurred during the conveyance of a large quantity of data from backup server 200E to agent 200A to data source 120A. Other data sources may have been the source of data associated with data stored in data source 120A. Therefore, backup server 200E may convey portions of the logical backup data set to agent 200A via data transfer 612, from which these portions of the logical backup data set may be forwarded to their respective agents via data transfers 614. For example, agent 200A may convey data associated with data stored in data source 120A to agent 200B via data transfer 614B. Agent 200B may, in turn, restore this data to data source 120B via data transfer 616B. Similarly, agent 200A may convey data associated with data stored in data source 120A to agent 200C via data transfer 614C. Agent 200C may, in turn, restore a portion of this data to data source 120C via data transfer 616C. In addition, agent 200C may convey another portion of the associated data to agent 200D via data transfer 618D. Agent 200D may, in turn, restore this data to data source 120D via data transfer 619D, completing the data transfer phase of the restore operation.

FIG. 6C illustrates a procedure that may be used by distributed data protection application 200 to unlock an internal state of data sources associated with distributed application 110 upon completion of a restore operation. As shown, backup server 200E may initiate an unlock sequence by sending unlock request 620 to agent 200C. Agent 200C may respond by sending unlock request 622 to locking API 240 of distributed application 110. Distributed application 110 may send unlock requests 624A-624D to each of locks 210A-210D.

Figure 7:
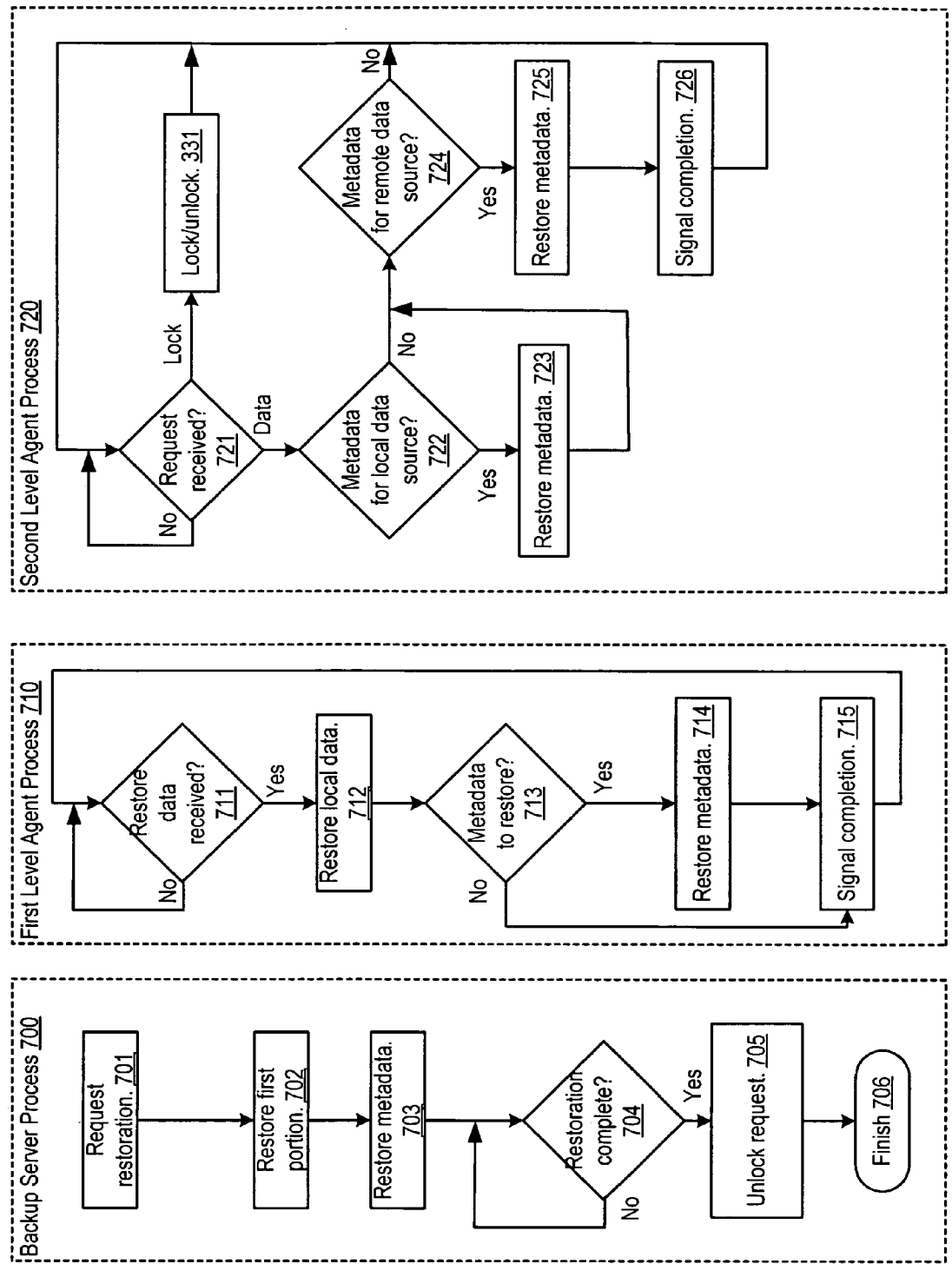
FIG. 7 is a flow chart depicting one embodiment of processes which may be performed by a distributed data protection application during a restore operation.

FIG. 7 is a flow chart of the processes of one embodiment of distributed data protection application 200 that may be executed during a restore operation. As shown, application 200 may include processes 700-720. During a restore operation a backup server, such as server 200E, may perform the operations indicated by block 700. Also, processes 710 may be executed by one or more first-level agents such as an agent that is associated with a data source that is a database (for example, agent 200A) or an agent that is associated with a data source that contains data associated with data on another data source (for example, agents 200B and 200D). In addition, processes 720 may be executed by a second-level agent such as an agent that provides the service of locating associated data for other agents and/or an agent on a host that hosts a locking API of a distributed application (for example, agent 200C).

In the embodiment shown, a backup server may request a restoration (block 701) of logical backup data set to a selected data source and other data sources from which associated data was copied during a backup operation (for example, data sources 120A-120D). In one embodiment, block 701 may also include a request to lock an internal state of the data sources to be restored. A detailed description of the lock/ unlock process is given below. Subsequent to locking the internal state of the data sources, the backup server may restore a first portion of the logical backup data set to the selected data source (block 702). Following restoration of the first portion, the backup server may convey the data associated with the data stored in the selected data source to the agent associated with the selected data source (block 703). After conveying the associated data, the backup server waits for acknowledgement that all portions of the logical backup data set have been restored in loop 704. When the restoration has been acknowledged, the backup server may send a request to unlock the internal state of the restored data sources (block 705). Finally, acknowledgement of unlock completion may be received (block 706).

Continuing to refer to FIG. 7, in one embodiment, a first-level agent may wait for a request from a backup server to restore the data set stored in its local data source (loop 711). Following receipt of a data transfer, the first-level agent may restore data to the local data store if local data is included in the data transfer (block 712). The first level agent may then test for the presence of data to be restored (loop 713). If there is associated data in the data transfer, the first-level agent may locate the agent associated with each portion of data and convey each portion to its respective agent (block 714). If there is no associated data to be restored or upon completion of block 714, process 710 may then send a signal back to the backup server indicating completion of the restoration (block 715). The first-level agent may also return to loop 711, thereby completing process 710.

Again referring to FIG. 7, an agent that operates at a second level of a distributed data protection application may execute processes 720. In the illustrated embodiment, the second-level agent may wait for a request (loop 721) from a backup server executing process 700 or a first-level agent executing process 710. Following receipt of a lock or an unlock request, the second-level agent may forward a corresponding lock or unlock request to a locking API (block 331). A detailed description of the lock/unlock process is given below. Upon completion of the lock/unlock process, the second-level agent may wait for additional requests (loop 721). If a data transfer is received, the second-level agent may determine if there is local data to be restored (decision block 722). If so, the second-level agent may restore the local data (block 723). If there is no local data to be restored, or upon completion of block 723, the second-level agent may determine if there is data to be restored to other data sources (decision block 724). If so, the second-level agent may locate the agents from which the data of interest originated and convey a respective portion of the data to each of these agents (block 725). Once the associated data has been restored, the second-level agent may send a restoration complete signal back to the first-level agent (block 726) and return to loop 721, thereby completing process 720.

Figure 8:
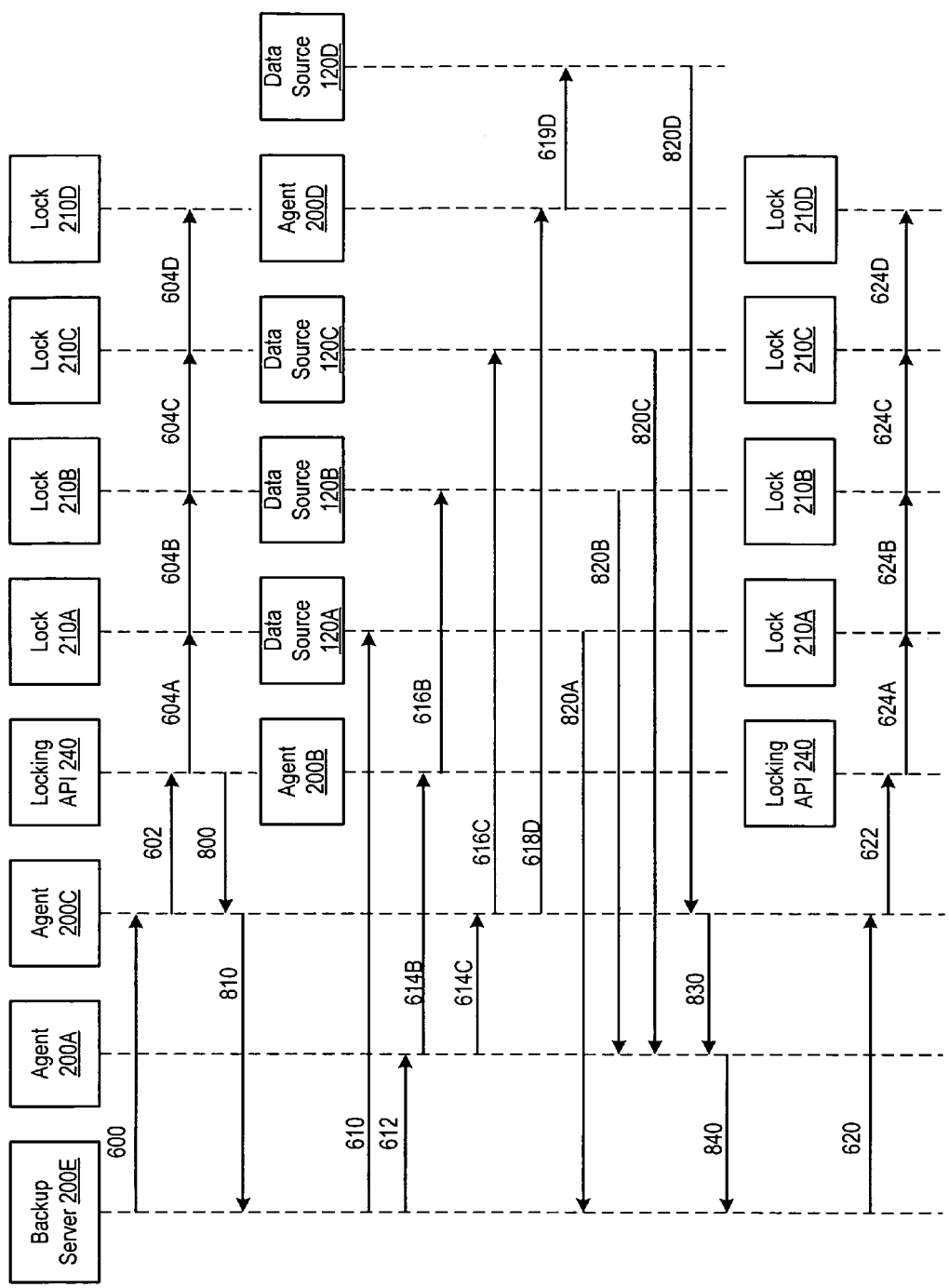
FIG. 8 illustrates one embodiment of a sequence diagram corresponding to a restoration of a logical backup data set to a data source.

FIG. 8 illustrates one embodiment of a sequence diagram corresponding to a restoration of a logical backup data set to data source 120A, using the combined features illustrated in FIGS. 6 and 7. Depending on the configuration of the distributed application of which data source 120A is a part, numerous variations are possible involving associated data stored on additional data sources, communication with additional agents, and communication with various APIs of the distributed application such as a locking API. In the illustrated embodiment, data source 120A stores a data set that is associated with data located on data sources 120B-120D. Data sources 120A-120D together store the data used by a distributed application. Agent 200A may have access to information in the logical backup data set indicating that there is associated data to be restored to other data sources such as, in the illustrated example, 120B and 120C. Agent 200A may also have access to information from the distributed application indicating that an agent, for example agent 200C, resides on a host that has access to a locking API for the distributed application that may lock an internal state of data sources 120A-120D. Agent 200A may also have access to information from the distributed application indicating that an agent, for example agent 200C, is able to query other data sources to find the destination of additional data contained in the logical backup data set.

As shown in FIG. 8, a restore operation to restore data source 120A may be initiated by backup server 200E sending lock request 600 to agent 200C. In response, agent 200C may signal locking API 240 via lock request 602 to lock the internal state of data sources 120A-120D via respective lock requests 604A-604D. Upon completion of the lock process, locking API 240 may send lock complete signal 800 to agent 200C, which, in response, may send lock complete signal 810 to backup server 200E. At this point backup server 200E may begin to convey portions of the logical backup data set for restoration.

Continuing to refer to FIG. 8, once the internal state of data sources 120A-120D is locked, backup server 200E may send data transfers 610 and 612 to data source 120A and agent 200A respectively. Data transfer 610 may convey the largest portion of the logical backup data set to data source 120A for restoration. Data source 120A may restore its data and send restoration complete signal 820A back to backup server 200E. Data transfer 612 may convey associated data to agent 200A, which may cause a portion of the associated data to be conveyed via data transfer 614B to agent 200B and another portion of the associated data to be conveyed via data transfer 614C to agent 200C. In response, agent 200B may cause a restoration of associated data to data source 120B via data transfer 616B. Data source 120B may then send restoration complete signal 820B back to agent 200A. Similarly, agent 200C may cause a restoration of associated data to data source 120C via data transfer 616C. Data source 120C may then send restoration complete signal 820C back to agent 200A. Agent 200C may also send data transfer 618D to agent 200D, which may cause a restoration of associated data to data source 120D via data transfer 619D in response. Data source 120D may then send restoration complete signal 820D back to agent 200C. Data source 120C may then send restoration complete signal 830 back to agent 200A. Agent 200A may then send restoration complete signal 840 back to backup server 200E. Once backup server 200E has received restoration complete signals 820A and 840, it may send unlock request 620 to agent 200C, which may signal locking API 240 via unlock request 622 to unlock the internal state of data sources 120A-120D via respective unlock requests 624A-624D.

Figure 9:
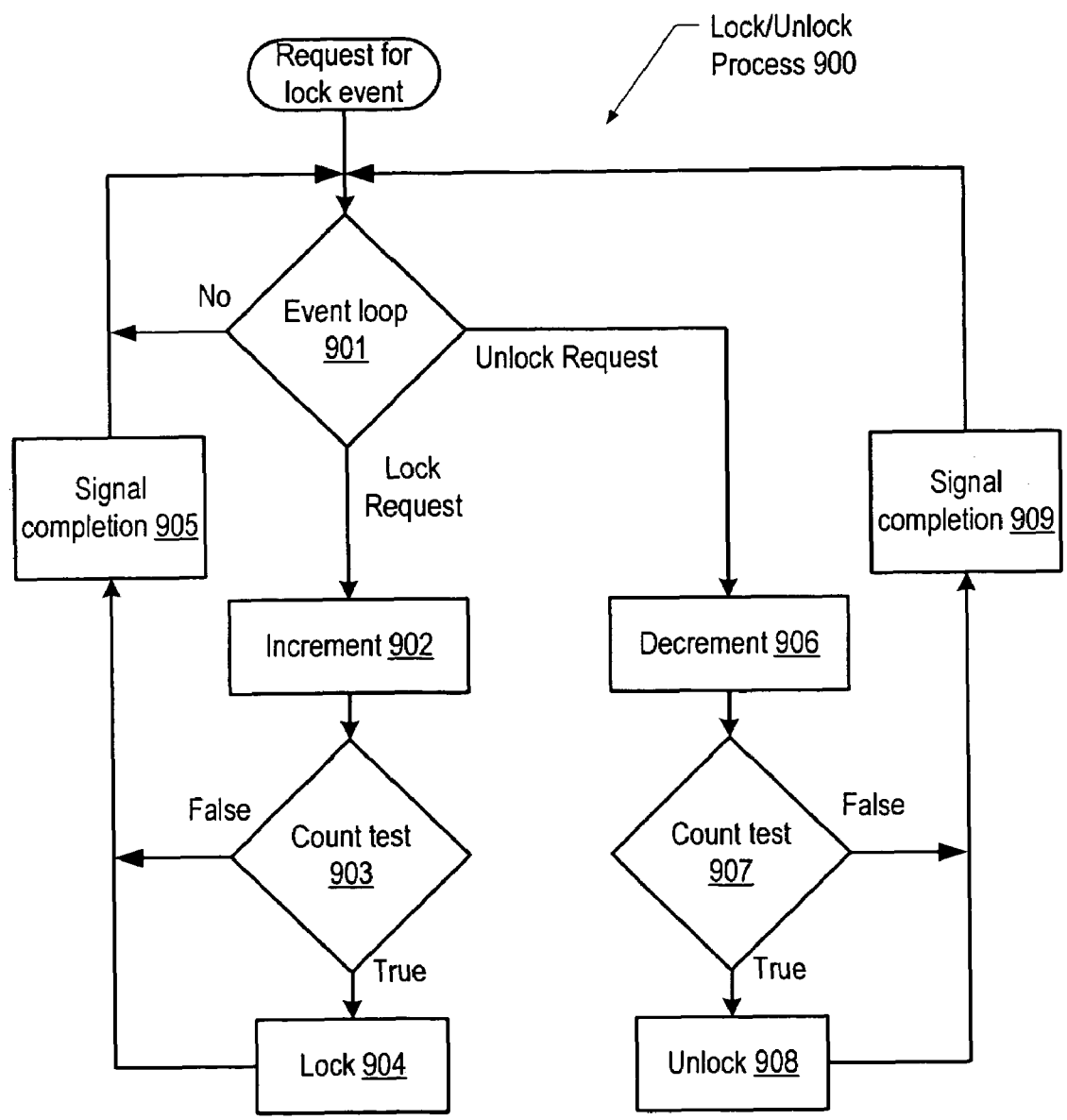
FIG. 9 illustrates one embodiment of a method for managing lock and unlock requests during backup and restore operations.

FIG. 9 illustrates one embodiment of a method for managing lock and unlock requests during backup and restore operations to be executed by a distributed data protection application. An agent on a host that hosts a locking API of a distributed application (e.g., an arbiter) may execute the illustrated lock/unlock process 900. As shown, the arbiter may detect a lock event (loop 901). If a lock request is received, the arbiter may increment a lock count (block 902). After incrementing the lock count, the arbiter may then test the lock count (decision block 903). If the lock count matches a test criterion (for example, is less than or equal to 1), the arbiter may signal the locking API of the distributed application to lock an internal state of its data sources (block 904). Upon completion of block 904, or if the lock count does not match the test criterion, the arbiter may return a signal to the requester of the lock operation that the lock operation has been completed (block 905). The arbiter may then return to loop 901, completing the lock operation.

If an unlock request is received, the arbiter may decrement a lock count (block 906). After decrementing the lock count, the arbiter may then test the lock count (decision block 907). If the lock count matches a test criterion (for example, is less than 1), the arbiter may signal the locking API of the distributed application to unlock an internal state of its data sources (block 908). Upon completion of block 908, or if the lock count does not match the test criterion, the arbiter may return a signal to the requester of the unlock operation that the unlock operation has been completed (block 909). The arbiter may then return to loop 901, completing the unlock operation.

A distributed application may implement various lock/unlock policies. For example, a distributed application's locking API may lock or unlock all data sources together, regardless of whether or not they store data associated with a data stored in the data source that is being backed up. Alternatively, a distributed application's locking API may lock or unlock selected data sources that have data associated with a data stored in the data source that is being backed up. Accordingly, in one embodiment, lock requests such as 232, 234, 600, and 602, may include an enumeration of selected data sources to be locked. Similarly, unlock requests such as 270, 272, 620, and 622, may include an enumeration of selected data sources to be unlocked. In alternative embodiments, lock and unlock requests may not include an enumeration of selected data sources.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
    a first agent on a first host;
    a second agent on a second host;
    a plurality of data sources; and
    a backup server configured to send a first request for a logical backup data set, said logical backup data set comprising data distributed on the plurality of data sources;
    wherein in response to the first request, the first agent is configured to:
        convey a first portion of the logical backup data set from a first data source of the plurality of data sources to the backup server; and
        send a second request for backup data to the second agent;
    wherein in response to the second request, the second agent is configured to convey a second portion of the logical backup data set from a second data source of the plurality of data sources;
    wherein the second agent is further configured to convey the second portion of the logical backup data set to the first agent; and
    wherein the first agent is further configured to convey the second portion of the logical backup data set to the backup server.

2. The system as recited in claim 1,
    wherein the second request identifies at least a subset of the data stored on the second data source; and
    wherein in response to the second request, the second agent is configured to convey the subset of the data stored on the second data source to the first agent.

3. The system as recited in claim 1,
    wherein in response to the first request, the first agent is configured to send a lock request to a third agent; and
    wherein in response to the lock request, the third agent is configured to cause a locking of an internal state of the logical backup data set.

4. The system as recited in claim 3,
    wherein upon completion of the conveyance of the first and second portions of the logical backup data set to the backup server, the first agent is configured to send a lock release to the third agent; and
    wherein in response to the lock release, the third agent is configured to cause an unlocking of an internal state of the data set.

5. The system as recited in claim 4, wherein the third agent is further configured to:
    maintain a count of a number of pending locks;
    increment the count upon receipt of a lock request;
    decrement the count upon receipt of a lock release;
    cause a locking of an internal state of the logical backup data set when the count rises from zero to one; and
    cause an unlocking of an internal state of the data set when the count falls to zero.

6. The system as recited in claim 1,
    wherein the backup server is configured to convey the first and second portions of the logical backup data set to the first agent;
    wherein the first agent is configured to:
        cause a restoration of the first portion of the logical backup data set to the first data source; and
        convey the second portion of the logical backup data set to the second agent; and
    wherein the second agent is configured to cause a restoration of the second portion of the logical backup data set to the second data source.

7. The system as recited in claim 1,
    wherein in response to the second request, the second agent is further configured to send a third request to a third agent on a third host;
    wherein in response to the third request, the third agent is configured to convey a third portion of the logical backup data set from a third data source of the plurality of data sources to the second agent; and
    wherein the second agent is further configured to:
        append the third portion of the logical backup data set to the second portion of the logical backup data set; and
        convey both the second portion of the logical backup data set and the appended third portion of the logical backup data set to the first agent; and
    wherein the first agent is further configured to convey the second and third portions of the logical backup data set to the backup server.

8. A method of protecting data distributed on a network of computers, wherein the network includes a backup server, a first agent, a second agent, and a plurality of data sources, the method comprising:
    sending a first request for a logical backup data set from the backup server to the first agent, said logical backup data set comprising data distributed on the plurality of data sources;
    conveying a first portion of the logical backup data set from a first data source of the plurality of data sources to the backup server, wherein said first portion is conveyed to the backup server by the first agent in response to the first request; and sending a second request for backup data to the second agent, wherein said second request is sent by the first agent in response to the first request;

conveying a second portion of the logical backup data set from a second data source of the plurality of data sources, wherein said second portion is conveyed by the second agent in response to the second request; and storing the logical backup data set on a backup medium;

wherein conveying the second portion of the logical backup data set from a second data source further comprises conveying the second portion to the first agent; and the first agent conveying the second portion of the logical backup data set to the backup server.

9. The method of claim 8, wherein the second request identifies at least a subset of the data stored on the second data source, the method further comprising conveying the subset of the data stored on the second data source to the first agent, wherein said conveying the subset of the data stored on the second data source is performed by the second agent in response to the second request.

10. The method of claim 9, further comprising:

sending a lock request to a third agent from the first agent; and causing a locking of an internal state of the logical backup data set, wherein said causing is performed by the third agent in response to the lock request.

11. The method of claim 10, further comprising:

sending a lock release to the third agent, wherein said sending a lock release is performed by the first agent upon completion of the conveyance of the first and second portions of the logical backup data set to the backup server; and causing an unlocking of an internal state of the logical backup data set, wherein said causing an unlocking is performed by the third agent in response to the lock release.

12. The method of claim 8, further comprising:

conveying the first and second portions of the logical backup data set to the first agent from the backup server;

causing a restoration of the first portion of the logical backup data set to the first data source, wherein said causing a restoration of the first portion is performed by the first agent;

conveying the second portion of the logical backup data set to the second agent, wherein said conveying the second portion is performed by the first agent; and causing a restoration of the second portion of the logical backup data set to the second data source, wherein said causing a restoration of the second portion is performed by the second agent.

13. The method of claim 8, further comprising:

sending a third request for backup data to a third agent, wherein said sending a third request is performed by the second agent in response to the second request;

conveying a third portion of the logical backup data set from a third data source of the plurality of data sources to the second agent, wherein said conveying a third portion is performed by the third agent in response to the third request.

14. One or more computer readable storage media storing computer instructions which when executed by a processor, perform the steps comprising:

sending a first request for a logical backup data set from a backup server to a first agent, said logical backup data set comprising data distributed on a plurality of data sources;

conveying a first portion of the logical backup data set from a first data source of the plurality of data sources to the backup server, wherein said first portion of the logical backup data set is conveyed by the first agent in response to the first request;

sending a second request for backup data to a second agent, wherein said second request is sent by the first agent in response to the first request;

conveying a second portion of the logical backup data set from a second data source of the plurality of data sources, wherein said second portion of the logical backup data set is conveyed by the second agent in response to the second request; and storing the logical backup data set on a backup medium;

wherein said second portion of the logical backup data set is conveyed by the second agent to the first agent; and conveying the second portion of the logical backup data set from the first agent to the backup server.

15. The computer readable storage media as recited in claim 14, wherein the second request identifies at least a subset of the data stored on the second data source; and wherein the instructions which when executed further perform the steps comprising conveying the subset of the data stored on the second data source to the first agent, wherein the subset of the data stored on the second data source is conveyed by the second agent in response to the second request.

16. The computer readable storage media as recited in claim 14, wherein the instructions which when executed further perform the steps comprising: sending a lock request to a third agent, wherein said lock request is sent by the first agent; and causing a locking of an internal state of the logical backup data set, wherein said locking is caused by the third agent in response to the lock request.

17. The computer readable storage media as recited in claim 16, wherein the instructions which when executed further perform the steps comprising: sending a lock release to the third agent, wherein said lock release is sent by the first agent upon completion of the conveyance of the first and second portions of the logical backup data set to the backup sever; and causing an unlocking of an internal state of the data set, wherein said unlocking is caused by the third agent in response to the lock release.

18. The computer readable storage media as recited in claim 17, wherein the instructions which when executed further cause the third agent to:

maintain a count of a number of pending locks;

increment the count upon receipt of a lock request;

decrement the count upon receipt of a lock release;

cause a locking of an internal state of the data set when the count rises from zero to one; and cause an unlocking of an internal state of the data set when the count falls to zero.

19. The computer readable storage media as recited in claim 14, wherein the instructions which when executed further perform the steps comprising:

conveying the first and second portions of the logical backup data set to the first agent from the backup server;

restoring the first portion of the logical backup data set to the first data source, wherein said first portion if restored by the first agent; and conveying the second portion of the logical backup data set to the second agent from the first agent; and restoring the second portion of the logical backup data set to the second data source, wherein said second portion is restored by the second agent.

* * * * *